US005361979A

United States Patent [19]

[11] Patent Number: 5,361,979

[45] Date of Patent: Nov. 8, 1994

Anello et al.

[54] CHANGE RETURN PROTECTION DEVICE

[75] Inventors: Salvatore Anello; Nathan Turk, both of Highland, N.Y.

[73] Assignee: Sandt Technology, Ltd., Highland, N.Y.

[21] Appl. No.: 981,284

[22] Filed: Nov. 25, 1992

[51] Int. Cl.[5] .......................... B65G 11/00; G07F 3/00

[52] U.S. Cl. .................................. 232/57.5; 194/203; 194/202; 379/145

[58] Field of Search .................... 232/55, 57, 57.5, 58; 379/145; 194/200, 202, 203, 320

[56] References Cited

U.S. PATENT DOCUMENTS

| | | | |
|---|---|---|---|
| 1,901,944 | 3/1933 | Allen . | |
| 1,921,071 | 8/1933 | Edwards . | |
| 1,921,072 | 8/1933 | Edwards . | |
| 2,004,615 | 6/1935 | Mills . | |
| 2,922,571 | 1/1960 | Kennedy et al. | 232/57.5 |
| 3,116,013 | 12/1963 | Eno et al. | 232/57.5 |
| 3,285,382 | 11/1966 | Williams, III | 194/203 |
| 3,302,872 | 2/1967 | Nawman . | |
| 4,180,183 | 12/1979 | Muller . | |
| 4,735,344 | 4/1988 | Wuethrich | 194/202 X |
| 4,761,809 | 8/1988 | Brancati | 194/202 X |
| 4,946,095 | 8/1990 | Anello et al. | 232/57.5 |
| 4,966,325 | 10/1990 | Anello et al. . | |
| 5,018,193 | 5/1991 | DeArkland | 194/202 X |
| 5,102,038 | 4/1992 | Anello et al. | 232/57.5 |

FOREIGN PATENT DOCUMENTS

| | | | |
|---|---|---|---|
| 2555213 | 5/1977 | Germany | 194/203 |
| 623422 | 5/1981 | Switzerland | 194/203 |
| 2201538 | 9/1988 | United Kingdom | 194/203 |

*Primary Examiner*—Michael Milano

*Attorney, Agent, or Firm*—Morgan & Finnegan

[57] ABSTRACT

A change return protection device is disclosed which prevents thieves from stuffing flexible material into the change return chutes of coin-operated machines. The device prevents stuffing of the change return chute when the change return door is opened by incorporating a blocking flap and a swinging flap around which the flexible material cannot be inserted. The device also includes a reinforcement plate which more securely joins the blocking flap to the change return door and a flat plate having V-shaped notch with sharpened edges which further prevents stuffing. Finally, the device includes an adjustable screw which restricts the size of the coin return door opening. The device is suitable for use in existing change return mechanisms.

7 Claims, 3 Drawing Sheets

CHANGE RETURN PROTECTION DEVICE

BACKGROUND AND OBJECTS OF THE INVENTION

1. Field of the Invention

The present invention relates generally to a coin return protection device and, more particularly, to a device which can be attached to existing payphone coin return doors to prevent tampering with the coin return mechanisms.

2. Description of the Prior Art

The payphone coin return mechanisms in use today typically comprise a hollow body having front and back walls and top and bottom walls which are joined by opposing side walls. An intermediate wall is situated between the top and bottom walls and extends from a point below the back of the top wall downwardly toward the front wall to define with the top wall and the side walls a throat for the coin return chute. The bottom wall of the chute extends downwardly from the front wall and then rearwardly upwardly toward the back wall. It thus forms with the intermediate and side walls a trough portion for the chute, the trough extending below and forwardly and rearwardly of the throat.

The front wall of the chute is provided with an opening which is normally closed by a pivotally mounted door and through which a finger of a caller can be inserted to retrieve returned coins delivered to the trough. Another opening is provided at the rear of the top wall of the chute. This opening receives coins which are being returned to a caller from the payphone's coin return mechanism. After the returned coins pass through this opening they fall onto the intermediate wall of the throat and slide downward to the trough at the bottom wall for retrieval by the caller as already described.

Theft of coins from payphone coin return chutes as a result of "stuffing" the coin return chute has been a continuing problem in payphones having coin return mechanisms of the type described above. Stuffing has been a serious problem for many years. According to one method of "stuffing" a payphone, the thief inserts a compressible obstruction through the coin return door, past the opening in the front wall and trough, into the throat of the chute. The obstructing material is typically cotton or polyester wadding, paper, fabric or plastic sheeting, and it is used to prevent the coins which would otherwise be returned to the payphone user from falling through the coin return chute. After sufficient time, a sizable number of coins accumulates behind the obstructing material. The blockage is removed by the thief using various means and the coins cascade into the coin return trough, ready to be retrieved. The obstructing material can be cleared out either manually or by using implements such as a pick or hook. Some individuals ignite the foreign material so that it burns and turns to ash. This latter technique may also damage the payphone's internal mechanisms.

The payphone stuffing problem is an old one. This crimal problem has cost the phone companies enormous sums of money. The phone companies would not have normally collected the money lost to the "stuffers," because in properly working payphones the coins are returned for uncompleted calls. However, the phone companies usually have to refund the money lost to their irate customers. Furthermore, each phone company must employ personnel to investigate reports of payphones failing to return change, employ maintenance workers to examine and repair "stuffed" phones, and have accounting and payment systems in place to refund lost money to payphone users. The overall administrative cost of repairing damaged payphones and refunding lost money are quite high, and there is a substantial need for an inexpensive device which can be quickly and simply installed in an existing payphone and reliably prevents stuffing.

Early attempts at preventing the type of theft described above centered around designing the payphone coin return mechanism in such a way that it became disabled when the chute was stuffed. This type of solution is described, for example, in U.S. Pat. Nos.: 1,887,576; 1,901,944; 1,921,071; 1,921,072; and 2,004,615. Although disabling the coin return mechanism prevented the theft of coins, it also made it impossible to return coins to the caller in the event a call was not completed. Disabling the coin return mechanism was not an entirely satisfactory solution to the theft problem, since it was not feasible to return the coins to a caller immediately. The returning of money for uncompleted telephone calls would require an additional message to an operator and forwarding a check to the caller. This process is very costly and inefficient.

More recent attempts to prevent this type of theft involved designing a return chute which is more difficult to stuff. In particular, the back wall of the chute below the intermediate wall was brought forward, reducing the area of the trough available for a thief to work in when attempting to insert the stuffing material. The back wall was replaced by an opening closed by a pivoting door so that the obstructing material might pass out of the chute. These modifications, however, did not prove successful and there is still a need for a more effective way of preventing the stuffing of payphone coin return chutes.

U.S. Pat. No. 4,761,809 describes another attempt to design an "unstuffable" coin return. A tubular member having pointed teeth at its front end is inserted into the coin return door. A blade having additional sharpened teeth is attached to the lower surface of the intermediate wall of the throat. These teeth are intended to slice up obstructing material so it cannot form blockages, but actual usage of this modification reveals rather that the teeth facilitate stuffing because they catch and hold the stuffing material.

Still another attempt to design an "unstuffable" coin return device is described by the present inventors in U.S. Pat. Nos.: 4,966,325; 4,946,095; and 5,102,038. A roughly P-shaped sealing plate is attached to the back of the coin return door. When the coin return door is pushed open to allow the user to retrieve a returned coin, the sealing plate blocks the coin return chute and prevents the insertion of obstructing material. However, it has been found that if the coin return door is pushed open before the coins have passed through the return chute, the returned coins, particularly dimes, can lodge between the sealing plate and the return chute side walls causing the sealing plate to remain jammed in the return chute. As a result, the phone companies incur the costs of refunding the non-returned coins, investigating the reports of payphones failing to return change and repairing the jammed payphones.

U.S. Pat. No. 5,018,193 describes yet another attempt to inhibit the stuffing of coin return chutes by providing mechanical gating devices within the coin return mechanism. In particular, a first gate plate is attached to the inside bottom portion of the coin return door such that it extends into the coin return trough. In addition, a second gate plate hangs downward from the front edge of the bottom wall of the coin return chute such that the first and second gate plates combine to close off access to the coin return chute when the coin return door is opened. Although these gate plates are intended to permit the return of coins while preventing a thief from stuffing obstructing material into the return chute, it has been found that coins passing through the return chute tend to lodge between the side walls of the return chute and the gates, thereby jamming the door closed and preventing the payphone user from retrieving returned coins.

Another method of "stuffing" a payphone involves running a string from the payphone coin insert slot through the coin return mechanism to the coin return trough such that the thief can attach a small bag to the string and pull the bag up into the coin return chute to catch returned coins. Accordingly, a thief will drill a hole in a coin and tie a string to the coin through the hole. Then the thief will insert the coin into the payphone unit and allow the coin to pass through the coin return mechanism such that the coin drops into the coin return trough. Once the coin and attached string fall into the trough, the thief attaches a bag to the string and pulls the bag into the coin return chute to catch coins.

Finally, some thieves resort to blocking the payphone coin return chutes by bending the coin return door and jamming it into the coin return chute such that the returned coins accumulate in the coin return chute behind the return door. In addition, it has been found that vandals or frustrated thieves are able to insert explosive devices such as firecrackers, cherry-bombs or M80s into the coin return trough and cause serious damage to the payphone unit.

OBJECTS OF THE INVENTION

It is therefore an object of the present invention to provide a new coin return protection device especially suited for use in payphones or coin-operated vending machines which are subject to theft by "stuffing."

Another object of the invention is to provide a coin return protection device which is simple in construction and inexpensive to manufacture.

Still a further object of the invention is to provide a coin return protection device that can be quickly and easily installed in existing payphones or coin-operated vending machines yet which is sturdy, durable and completely effective in preventing "stuffing" the coin return mechanism with foreign matter.

Still a further object of the invention is to provide a coin return protection device which prevents the insertion explosive devices into the coin return mechanism.

Other objects and advantages of the invention will be obvious based on the following description.

The accompanying drawings, referred to herein and constituting a part hereof, illustrate preferred embodiments of the invention, and together with the description, serve to explain the principles of the invention.

DESCRIPTION OF THE PREFERRED EMBODIMENTS

Referring now particularly to FIGS. 1–4 of the accompanying drawings, there is illustrated a preferred embodiment of a coin return protection device constructed in accordance with the present invention. As here preferably embodied, the modifications are advantageously adapted for use in public payphone coin return mechanisms.

While the apparatus for our invention as here embodied is particularly adapted to and was designed for use in public payphones the principles of operation of the invention are not limited to such usage. However, since the invention is especially suitable for such usage, reference will be made hereinafter thereto in order to provide an example of a practical and useful embodiment of the invention.

It will also be understood that the present invention is not limited to use in payphones, but may be adapted to use in other types of coin-operated machinery by slight changes in dimensions.

Figure 4:
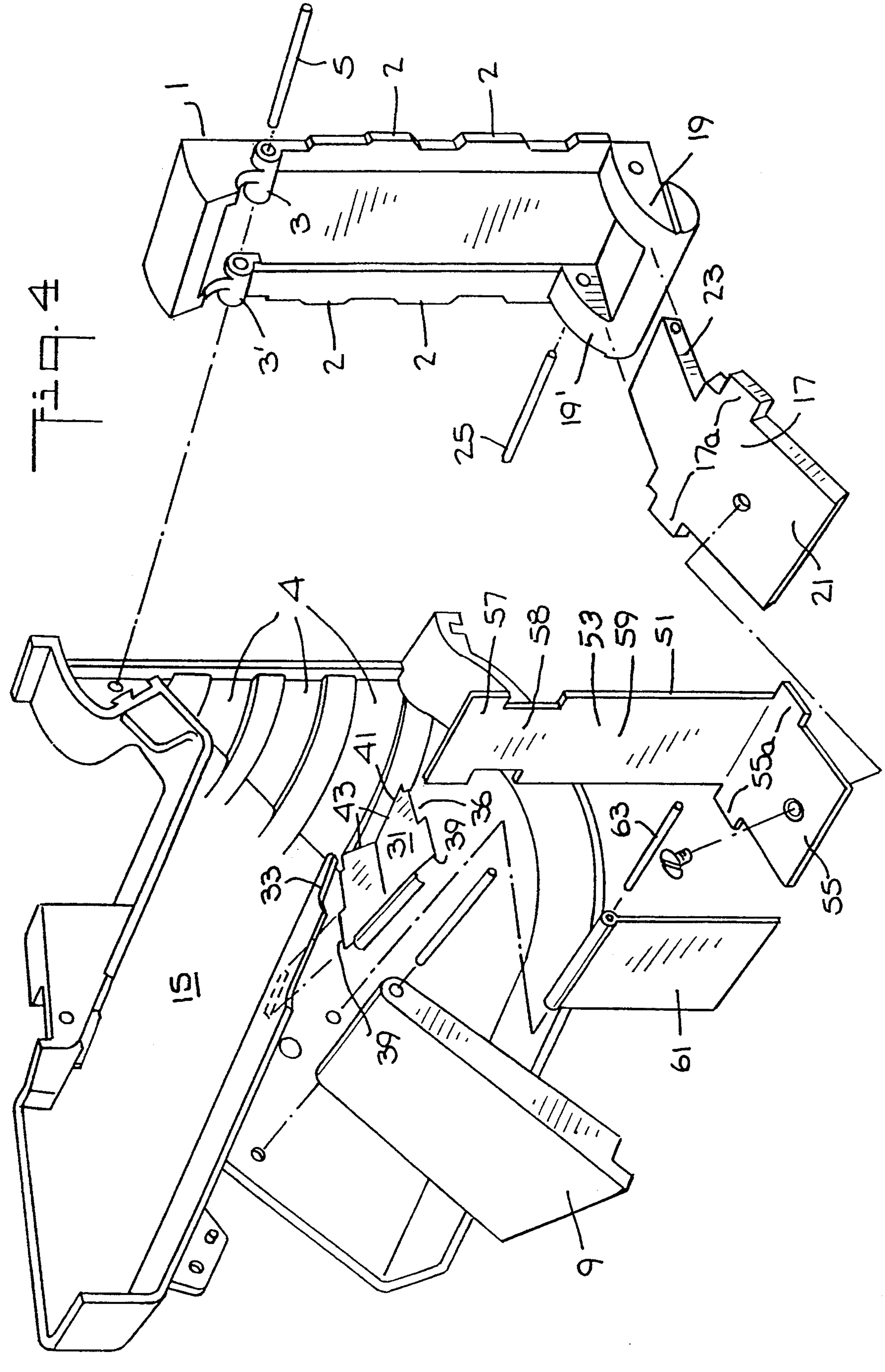
FIG. 4 is an exploded view of the coin return chute and door mounted with the device of the present invention.

FIG. 4 depicts, in exploded form, the preferred embodiment of the present invention. Door 1, an existing payphone component, serves as an anchor to which the invention is attached. Door i includes at its upper end two hinge supports 3 and 3' through which a press-fit pin 5 passes, allowing the door to pivot inwardly. Door 1 also includes side extension tabs 2 which fit within grooved ridges 4 in the side walls of return chute 15 such that side extension tabs 2 ride upon grooved ridges 4 when the door pivots inwardly. The invention is made up of five parts, a blocking flap 17, a reinforcement plate 51, a swinging flap 61, a flat plate 31, and an adjustable screw 7.

Blocking flap 17 is designed to be mounted on the coin return door 1 of a payphone. Because the bottom of coin return door 1 has internal tabs 19 and 19' which extend inwardly from its right and left sides, blocking flap 17 is configured to have a lower region 23 which is only slightly narrower in width than the space between tabs 19 and 19' at the bottom of door 1 and a wider upper neck region 21 which is rectangular in shape and only slightly narrower in width than the interior of the coin return box. In addition, because the interior side walls of the coin return box include grooves for guiding coin return door 1 upper neck region 21 includes side extension tabs (indicated at **17*a* in FIG. 1) which are dimensioned to fit within the grooved ridges 4 in the side walls to provide additional stability and prevent coins from lodging between the side walls and blocking flap 17. Blocking flap 17 is attached to door 1 by a press-fit pin 25 which passes through tabs 19 and 19'. This fastening method possesses the advantages of low cost, simplicity and sturdiness, but other means of attaching blocking flap 17 to door 1** such as screws, bolts and welds are equally satisfactory.

Those skilled in the mechanical arts will recognize that when force is applied normal to blocking flap 17 the resulting torque will tend to rotate blocking flap 17, loosening press-fit pin 25. Regardless of how blocking flap 17 is attached to door 1, the torque generated at its point of attachment will cause it to move, thereby weakening either the attachment means or bending blocking flap 17. Anchoring means are therefore necessary to more securely join blocking flap 17 to door 1. To this end, the present invention includes a reinforcement plate 51.

In its most basic form reinforcement plate 51 is a rectangular strip bent to have an obtuse angle between an upper region 53 and a lower region 55. Upper region 53 of reinforcement plate 51 is secured to the back side of payphone door 1 by press-fit pin 5. Alternatively, a plurality of rivets may be used alone or in combination with press-fit pin 5 to secure upper region 53 to door 1. However, it has been found that the use of rivets together with press-fit pin 5 to attach upper region 53 to door 1 is not necessary. Lower region 55 of reinforcement plate 51 is attached to blocking flap 17 by one or more rivets. Other attachment means well-known to those skilled in the mechanical arts such as screws, bolts and welds are equally acceptable and they can be used without affecting how the device operates.

In the preferred embodiment of the invention, upper region 53 of reinforcement plate 51 is configured to have a top portion 57 and bottom portion 59 which are slightly narrower in width than the back side of coin return door 1. Because door 1 has hinge supports 3 and 3, which extend inwardly from its right and left sides, upper region 53 is also configured to have a narrow neck portion 58 which is slightly narrower in width than the space between the two hinge supports 3 and 3' at the top of door 1. In this preferred form, upper region 53 of reinforcement plate 51 is secured to door 1 as it is mounted between door 1 and press-fit pin 5 which hinges door 1 to the coin return mechanism. As here embodied, upper region 53 of reinforcement plate 51 also strengthens door 1 to further inhibit attempts to block the return chute 15 by bending the face of the door and jamming it into the return chute.

Alternatively, upper region 53 of reinforcement plate 51 may be configured such that top portion 57 and neck portion 58 are slightly narrower in width than the space between hinge supports 3 and 3', whereas bottom portion 59 is slightly narrower in width than the back side of door 1.

In addition, lower region 55 preferably includes side extension tabs (indicated at **55*a* in FIG. 4) which are dimensioned to fit within the grooved ridges 4 in the side walls to provide additional stability and prevent coins from lodging between the side walls and lower region 55 of reinforcement plate 51**.

If the invention is to function properly, blocking flap 17 suitably engages the bottom wall of the return chute to block access to return chute 15 when coin return door 1 is pushed open. To this end, reinforcement plate 51 is preferably configured to have a slight obtuse angle of about 98 degrees between upper region 53 and lower region 55. Those skilled in the art will readily appreciate that if payphones built by different manufacturers have different return chute dimensions, the length of blocking flap 17 and the angle of bend in reinforcement plate 51 will have to be correspondingly adjusted.

To further hinder the insertion of obstructing material into return chute 15, the present invention includes swinging flap 61. Those skilled in the art will recognize that when coin return door 1 is only partly opened, blocking flap 17 will not completely block off access to return chute 15. As here embodied, swinging flap 61 is hinged by press-fit pin 63 at a position immediately below the bottom wall of return chute 15 such that swinging flap 61 combines with blocking flap 17 to block off access to return chute 15 when door 1 is only partly opened. Preferably, swinging flap 61 is positioned about one-half to one-third the distance from the front edge of the bottom wall of return chute 15 to pivoting door 9. In addition to blocking the insertion of obstructing material into return chute 15, swinging flap 61 acts to guide the obstructing material from the coin return trough through the opening in the back wall. To this end, swinging flap 61 is configured in a rectangular shape which is only slightly narrower in width than the trough region of the coin return mechanism.

Figure 1:
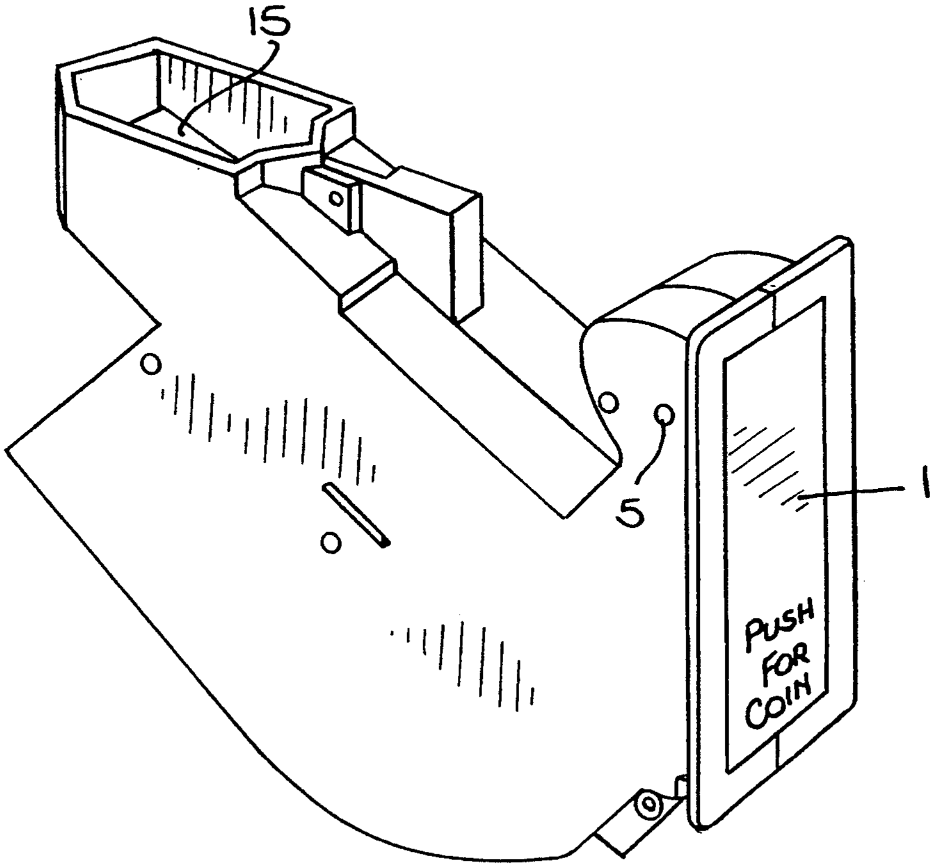
FIG. 1 is a perspective view of a conventional payphone coin return mechanism.
Figure 3:
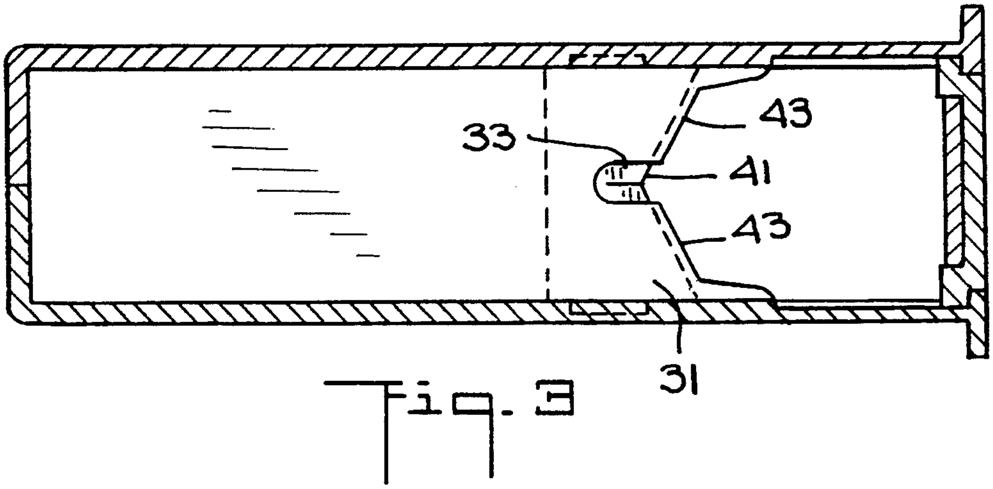
FIG. 3 is a cross-sectional view of the device of the present invention taken along line 3—3 of FIG. 2.

As shown in FIG. 3, existing coin return mechanisms often have a slot 33 in the bottom wall of the coin return passage In the present invention, flat plate 31 is attached to the bottom wall of the coin return passage 15 to prevent the theft of returned coins by either the insertion of obstructing material into the coin return chute or the placement of catch bags within the coin return chute.

Referring now to FIG. 4, in the preferred embodiment of the present invention flat plate 31 has a V-shaped notch 41 whose apex points away from door 1. The edges 43 of notch 41 are sharpened. Should a thief succeed in stuffing obstructing material past blocking flap 17 and swinging flap 61 this material will be guided into the V-shaped notch 41. The sharp edges 43 of notch will guide any obstructing material toward the apex while these sharpened edges 43 cut this material. Similarly, should a thief attempt to pull a catch bag into the return chute using a string inserted into the payphone unit, edges 43 will sever the string when the thief attempts to pull the bag into the return chute.

In addition, long leg 36 is dimensioned to allow door 1 to open sufficiently to admit a user's finger while simultaneously combining with blocking flap 17 to block off access to return passage 15.

Over the course of time the sharp edges 43 of the notch 41 may grow dull with repeated attempts to "stuff" the payphone. It may thus become necessary to remove flat plate 31 to sharpen the edges 43 of V-shaped notch 41.

In the preferred embodiment of the invention, flat plate 31 is attached to the existing coin return mechanism by two projecting tabs 39 which are suitably dimensioned to engage existing slots in the coin return mechanism. Those skilled in the art will recognize that other attachment means including, but not limited to, threaded fasteners, rivets and adhesives may be employed.

Figure 2:
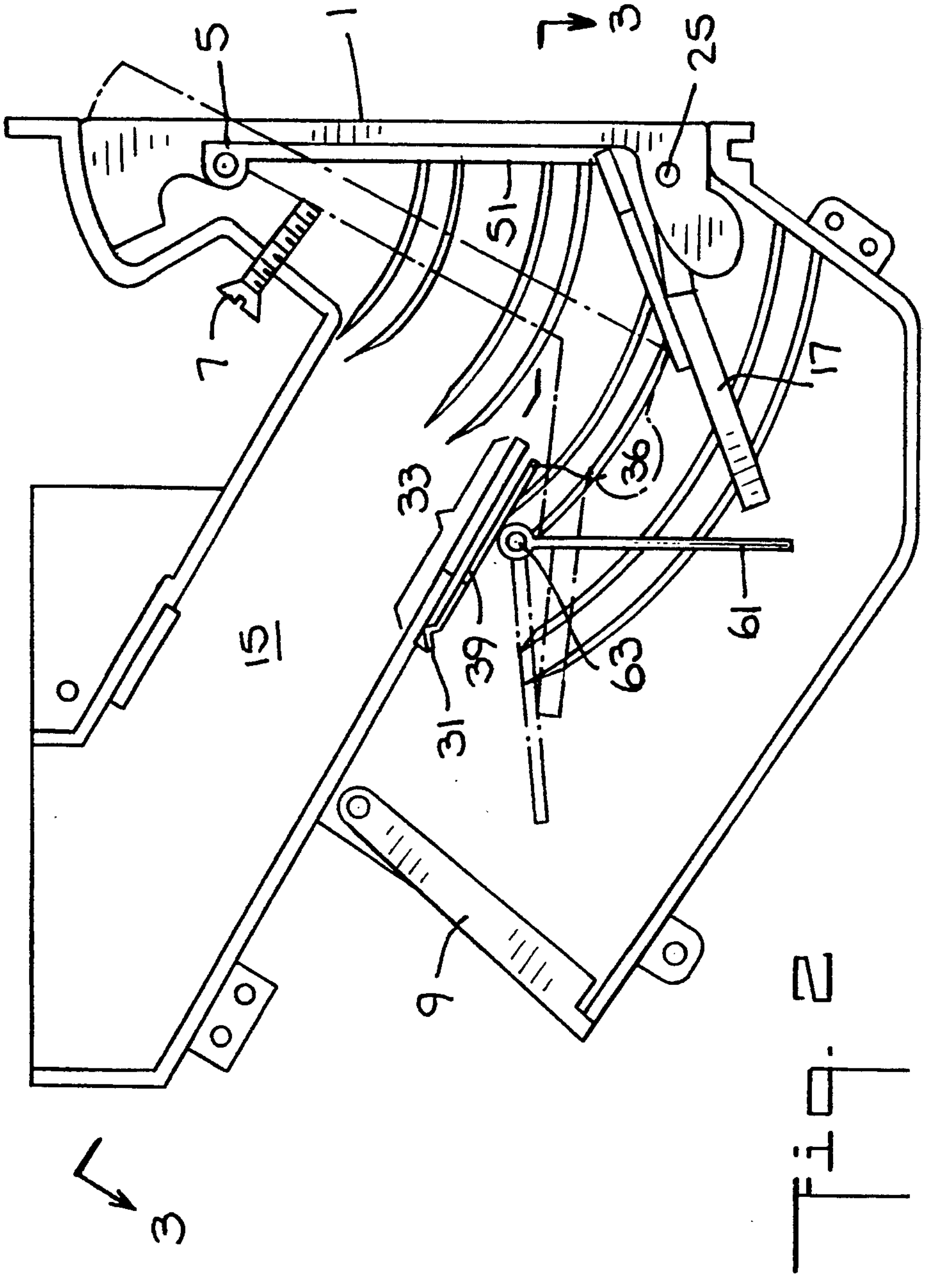
FIG. 2 is a cross-sectional view of the device of the present invention as mounted onto the coin return chute and door of a conventional coin return mechanism.

As illustrated in FIG. 2, in order to prevent the insertion of explosive devices such as fire crackers, cherry bombs and M80s, the coin return mechanism is provided with an adjustable screw 7 which is inserted into a hole in the front wall. Adjustable screw 7 is adapted to allow door 1 to open sufficiently to admit a user's finger to collect returned change but prevent the insertion of explosive devices into the coin return trough. Accordingly, screw 7 is screwed into the hole such that the end of the screw extending into return chute 15 limits the range in which door 1 may swing open and thereby restricts the size of the door opening and prevents the insertion of explosive devices.

The blocking flap, reinforcement plate, and swinging flap of the present invention can be made from any suitable material which is resistant to bending or breaking. To this end, blocking flap 17 and reinforcement plate 51 are preferably made from stainless steel plating of about 1/32" to $\frac{1}{4}$" thickness and aluminum plating of about $\frac{1}{4}$" to $\frac{1}{2}$" thickness, respectively.

The invention in its broader aspects is not limited to the specific embodiments herein shown and described but departures may be made therefrom within the scope of the accompanying claims, without departing from the principles of the invention and without sacrificing its chief advantages.

We claim:

1. A change return protection device for installation on the back side of a door to a coin return box of a coin-operated machine, said box having a top wall and a bottom wall which are joined by a first side wall and a second side wall and being connected to a coin return passage having a slotted lower wall comprising:

a blocking flap shaped to span the full width of said coin return passage and will not block the passage to prevent coins from falling past said blocking flap to be retrieved, said blocking flap prevents the insertion of obstructing material into said coin return passage;

means for joining said blocking flap to said door;

a reinforcement plate comprising a single strip of metal having a slight obtuse angle between an upper region and a flat lower region wherein said upper region is secured to the back side of said door and said flat lower region is secured to said blocking flap.; and a flat plate to block said slotted lower wall, said flat plate having a V-shaped notch with sharpened edges and being mounted in said coin return box so that said notch points away from said coin return door.

2. A change return protection device as in claim 1 wherein said means for joining said blocking flap to said door is a press-fit pin fixing said blocking flap to said door.

3. A change return protection device as in claim 2 wherein said lower region of said reinforcement plate further includes a first plurality of side extension tabs and wherein the inside surfaces of said first side wall and said second side wall which guide the path of said door in its movement include a plurality of grooves located for meshing relation with said first plurality of extension tabs.

4. A change return protection device as in claim 3 wherein said blocking flap further includes a second plurality of side extension tabs dimensioned for cooperative meshing with said plurality of grooves of said first side wall and said second side wall.

5. A change return protection device as in claim 4 which further comprises a swinging flap shaped to span the full width of said coin return passage and will not block the passage to prevent coins from falling past said swinging flap to be retrieved, wherein said swinging flap is positioned about one-half to one-third the distance from the front edge of said slotted lower wall to prevent the insertion of obstructing material into said coin return passage.

6. A change return protection device as in claims 5 which further comprises an adjustable screw mounted in said coin return box so as to limit the range in which said door may swing open to prevent the insertion of foreign objects into said coin return box.

7. A change return protection device as in claim 1 which further comprises an adjustable screw mounted in said coin return box so as to limit the range in which said door may swing open to prevent the insertion of foreign objects into said coin return box.

* * * * *